(12) United States Patent
Lenz et al.

(10) Patent No.: US 8,363,542 B2
(45) Date of Patent: Jan. 29, 2013

(54) ROBUST REMOTE RESET FOR NETWORKS

(75) Inventors: Dominik Lenz, Ludinghausen (DE); Markus Muller, Marl (DE); Stefan Mende, Recklinghausen (DE); Radha Krishna Atukula, Bochum (DE)

(73) Assignee: Nokia Corporation, Espoo (FI)

( * ) Notice: Subject to any disclaimer, the term of this patent is extended or adjusted under 35 U.S.C. 154(b) by 458 days.

(21) Appl. No.: 11/946,420

(22) Filed: Nov. 28, 2007

(65) Prior Publication Data

US 2008/0212493 A1 Sep. 4, 2008

Related U.S. Application Data

(60) Provisional application No. 60/867,469, filed on Nov. 28, 2006.

(51) Int. Cl.
*H04L 12/26* (2006.01)

(52) U.S. Cl. ........................................................ 370/216

(58) Field of Classification Search .................. 370/216, 370/310, 464, 465, 474; 709/220–223, 245, 709/246
See application file for complete search history.

(56) References Cited

U.S. PATENT DOCUMENTS

| 5,581,549 | A | * | 12/1996 | Mochinaga | 370/216 |
| 6,263,388 | B1 | * | 7/2001 | Cromer et al. | 710/107 |
| 7,002,975 | B2 | * | 2/2006 | Galicki et al. | 370/401 |
| 7,644,261 | B2 | * | 1/2010 | Hsieh | 713/1 |
| 2003/0043751 | A1 | * | 3/2003 | Nelson | 370/244 |
| 2003/0224768 | A1 | * | 12/2003 | Adjamah | 455/418 |
| 2005/0060529 | A1 | * | 3/2005 | Chen | 713/2 |
| 2005/0257041 | A1 | * | 11/2005 | Wallenstein et al. | 713/2 |
| 2007/0250682 | A1 | * | 10/2007 | Moore et al. | 712/16 |

FOREIGN PATENT DOCUMENTS

| EP | 1 139 611 A | 10/2001 |
| EP | 1 473 883 A | 11/2004 |

OTHER PUBLICATIONS

Jung, Adaptation layer for the support of multiple physical layer technologies, Proceedings of ICCT, 2003, pp. 1388-1391.*
International Search Report for PCT Application No. PCT/EP2007/010327 dated May 21, 2008, pp. 1-12.

* cited by examiner

*Primary Examiner* — Dmitry H Levitan

(74) *Attorney, Agent, or Firm* — Ditthavong Mori & Steiner, P.C.

(57) ABSTRACT

An approach provides a reset trigger signaling in a network, wherein a reset trigger is generated, which carries a device indicator for indicating a target device. To trigger a reset procedure, the reset trigger is signaled over the network by using a protocol layer lower than a network layer. At a network entity, it is checked whether the device indicator indicates this network entity; and the reset procedure is initiated in response to the result of this checking. Thereby, the reset trigger works independent of the network topology and will reach the destination device, even if a higher protocol layer is blocked due to error situations, so that a robust and flexible reset signaling procedure can be provided.

26 Claims, 12 Drawing Sheets

FIG. 4

| PAParam | Meaning |
|---|---|
| 0×01 | ResetType1 |
| 0×02 | ResetType2 |
| 0×03 | ResetType3 |

FIG. 5

| | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 501 { | 1 | | | ESC_PA=0x00 507 | | | | | | PAParam={ 0x01 \| 0x02 \| 0x03 } 505 | | | | | | | |
| 503 { | 1 | | | ESC_PA=0x00 511 | | | | | | PAParam={TargetDeviceID \| BroadcastID \| MulticastID1,{MulticastID2, ...}} 509 | | | | | | | |

ROBUST REMOTE RESET FOR NETWORKS

RELATED APPLICATIONS

This application claims the benefit of the earlier filing date under 35 U.S.C. §119(e) of U.S. Provisional Application Ser. No. 60/867,469 filed Nov. 28, 2006, entitled "Robust Remote Reset For Networks," the entirety of which is incorporated herein by reference.

BACKGROUND

Electronic devices, components or modules, such as integrated circuits (IC), should function within expected operating modes. It is thus important that they do not inadvertently enter an unexpected mode of operation. However, certain voltage profiles, particularly at power-up, can cause an electronic device, component or module to enter an undesired mode of operation. In extreme cases, such operation may cause permanent damage, for instance, through excessive current flow resultant from an operation at lower voltage or through erroneous operation caused by an operation outside of a specified range.

Holding or setting the device, component or module in a reset mode can deter improper operation. One conventional approach to this issue is the use of a power-on-reset (POR) circuit to provide the reset functions. POR circuits are common components in many modern electronic devices or systems.

As an alternative, external components performing a supervisory function (e.g., supervisory components) have been proposed to monitor system condition(s) and provide reset signaling where at least one insufficient condition is present, for instance when low voltage conditions occur.

Normally, reset signaling is applied separately by means of reset wires for each device, component or module. This approach leads to drawbacks such as high pin count and limited topology. Typically, all reset wires would be connected to the main processor of a concerned device or system, which may become a problem in the case where reset signals have to cross a hinge.

In classical networks, e.g., TCP/IP (Transmit Control Protocol/Internet Protocol) based networks, a special protocol like SNMP (Simple Network Management Protocol) is used to reset remote devices. Such an approach always involves at least the network layer defined in the OSI (Open Systems Interconnection) model to be able to route the remote reset command to the target. This however leads to the drawback that any failures in higher OSI protocol layers (e.g., data link layer (Layer 2), network layer (Layer 3), transport layer (Layer 4)) or a head of line blocking (which can happen locally to a certain layer or throughout the whole layer stack) will prevent the reset message from reaching its destination, which also reduces reliability.

SOME EXEMPLARY EMBODIMENTS

Therefore, there is a need for an approach to provide an enhanced reset signaling method, device and/or system, by means of which a flexibility and reliability of reset signaling can be increased.

According to one embodiment of the invention, a method comprises generating a reset trigger which carries a device indicator for indicating at least one target device; using a protocol layer lower than a network layer to signal said reset trigger over a network so as to trigger a reset procedure; checking at a network entity whether said device indicator indicates said network entity; and initiating a reset procedure in response to the result of said checking.

According to another embodiment of the invention, a transmitting-type of network entity comprises a generating unit for generating a reset trigger which carries a device indicator for indicating at least one target device; and a signaling unit for using a protocol layer lower than a network layer to signal said reset trigger over a network so as to trigger a reset procedure.

According to another embodiment of the invention, a receiving-type of network entity comprises: a receiving unit for receiving a reset trigger from a network via a protocol layer lower than a network layer; a checking unit for checking whether a device indicator of said received reset trigger indicates said network entity; and a reset control unit for indicating a reset procedure in response to the checking result of said checking unit.

According to another embodiment of the invention, a system comprises at least one of transmitting-type of network entity. The system also comprises at least one of the receiving-type network entity. The transmitting-type and receiving-type of network entities may be provided in a single network entity capable of both transmitting and receiving the reset trigger.

According to yet another embodiment of the invention, a computer program product comprises code means for producing the steps of the above methods when run on a computer device.

In an exemplary embodiment, a reset trigger can be sent in any type of internal or external network from any device (e.g., the main application processor) to any other device (e.g., graphics accelerator chip), for example, to resolve an error or other abnormal situation. In addition, a kind of broadcast-type reset trigger can be defined to reset every device in the network so as to restart a completely congested network. In addition, a kind of multicast-type reset trigger can be defined to reset a plurality of devices in the network so as to restart a part of the network. Over each link, the reset trigger is signaled by utilizing services of a protocol layer (e.g., physical adaptation layer) lower than the network layer. Any network entity (e.g., device, element, node or switch of an external network or component, circuit, chip or module of an internal network) in the network can be reached by spreading the reset trigger on a low protocol layer. When a network entity receives the reset trigger on one of its ports, it checks the included device indicator. If the device indicator does not match with the own identity, the requested reset procedure is not performed inside the network entity and the reset trigger may be distributed via at least one remaining port of the network entity. If the device indicator matches with the own identity of the device or if it indicates a broadcast-type reset trigger, the requested reset procedure is performed inside the network entity, and the reset trigger may be distributed via at least one remaining port of the network entity.

Thus, the reset trigger works independent of the network topology, e.g., it is able to travel over multiple hops and switches. The reset trigger will reach the destination device, even if a higher protocol layer (e.g., L2 to L4) is blocked due to an error situation or the like. Thereby, a robust and flexible reset procedure can be provided. The reset trigger will reach the destination device, even if the whole network is congested, since the proposed mechanism is not dependent on any congestion-avoiding mechanism (e.g., flow-control) of higher layers. Moreover, the reset trigger will reach the destination device, even if the network is misconfigured.

Additionally, a type information indicating a reset type may be added to the reset trigger, e.g., by the generating unit of the transmitting network entity. The reset procedure may then be selected based on this type information. The selection may be done e.g., by the reset control unit of the receiving network entity.

The protocol layer used for signaling the reset trigger may be a physical adaptation layer arranged between a physical layer and the data link layer. However, any other protocol layer below a network-type protocol layer may be used for signaling the reset trigger.

The network entity may be a circuit, a chip, a component, or a module, wherein the network may be an internal network provided inside a device. Alternatively or additionally, the network entity may be a terminal device, a network device, a network element, or a network node, wherein the network may be an external network provided outside a device.

To spread the reset trigger via the entire network to all desired network entities, the reset trigger may be distributed via all or at least one of the remaining ports of the network entity, which remaining ports differ from a port through which the reset trigger has been received, after initiating the reset procedure if the device indicator matches with the own identity of the network entity. This distribution may also be initiated if the device indicator indicates a broadcast operation or if the checking result indicates that the device indicator does not indicate or match with the own network entity. Furthermore, to prevent any circular distribution of the reset trigger, the trigger distribution may optionally be disabled for predetermined ports to thereby break circular dependencies. These distribution operations or functions may be performed or initiated by the reset control unit of the receiving network entity.

In a specific example, the type information may indicate at least one of multiple reset types (e.g., a "ResetType1"=cold reset, "ResetType2"=warm reset and "ReseType3"=end point reset). The first reset type ("ResetType1") may have allocated a higher priority than to the second reset type ("ResetType2").

The reset trigger may for example be signaled by a two-step procedure in which a first transmission is used to indicate the type information, while a second transmission is used to indicate the device indicator, or vice versa. More specifically, in a packet-based transmission, at least one of the type information and the device indicator may be signaled by setting a parameter value of a packet data unit of the protocol layer to a respective predetermined value.

To increase transmission reliability, a robust signaling mode (e.g., a slow speed mode) may be entered before signaling the reset trigger.

The above signaling operations or functions may be performed by the signaling unit of the transmitting network entity.

Furthermore, the receiving unit of the receiving network entity may be configured to derive at least one of the type information and the device indicator from a respective parameter value of a packet data unit of said protocol layer.

Predetermined symbols may be used to convey the at least one of multiple reset types. These predetermined symbols may already be provided by the used physical protocol layer.

Thus, no separate signaling lines or parameter are necessary. The predetermined symbols may be transmitted more than one time to trigger the reset procedure.

Still other aspects, features, and advantages of the embodiments of the invention are readily apparent from the following detailed description, simply by illustrating a number of particular embodiments and implementations, including the best mode contemplated for carrying out the embodiments of the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings and in which like reference numerals refer to similar elements and in which:

FIG. 4 is a diagram indicating exemplary parameter values for signaling reset types, in accordance with an embodiment of the invention;

FIG. 5 is a diagram indicating an exemplary reset trigger format, in accordance with an embodiment of the invention;

DESCRIPTION OF PREFERRED
EMBODIMENTS

An apparatus, method, and software for providing an enhanced reset signaling over a data network are described. In the following description, for the purposes of explanation, numerous specific details are set forth in order to provide a thorough understanding of the invention. It is apparent, however, to one skilled in the art that the invention may be practiced without these specific details or with an equivalent arrangement. In other instances, well-known structures and devices are shown in block diagram form in order to avoid unnecessarily obscuring the invention.

Although the invention is discussed with respect to a radio communication network (such as a cellular system) and the International Organization for Standardization (ISO) Open Systems Interconnection (OSI) Reference Model (OSI/RM), it is recognized by one of ordinary skill in the art that the invention has applicability to any type of communication systems, including wired systems, as well as other equivalent transport protocols.

Figure 1:
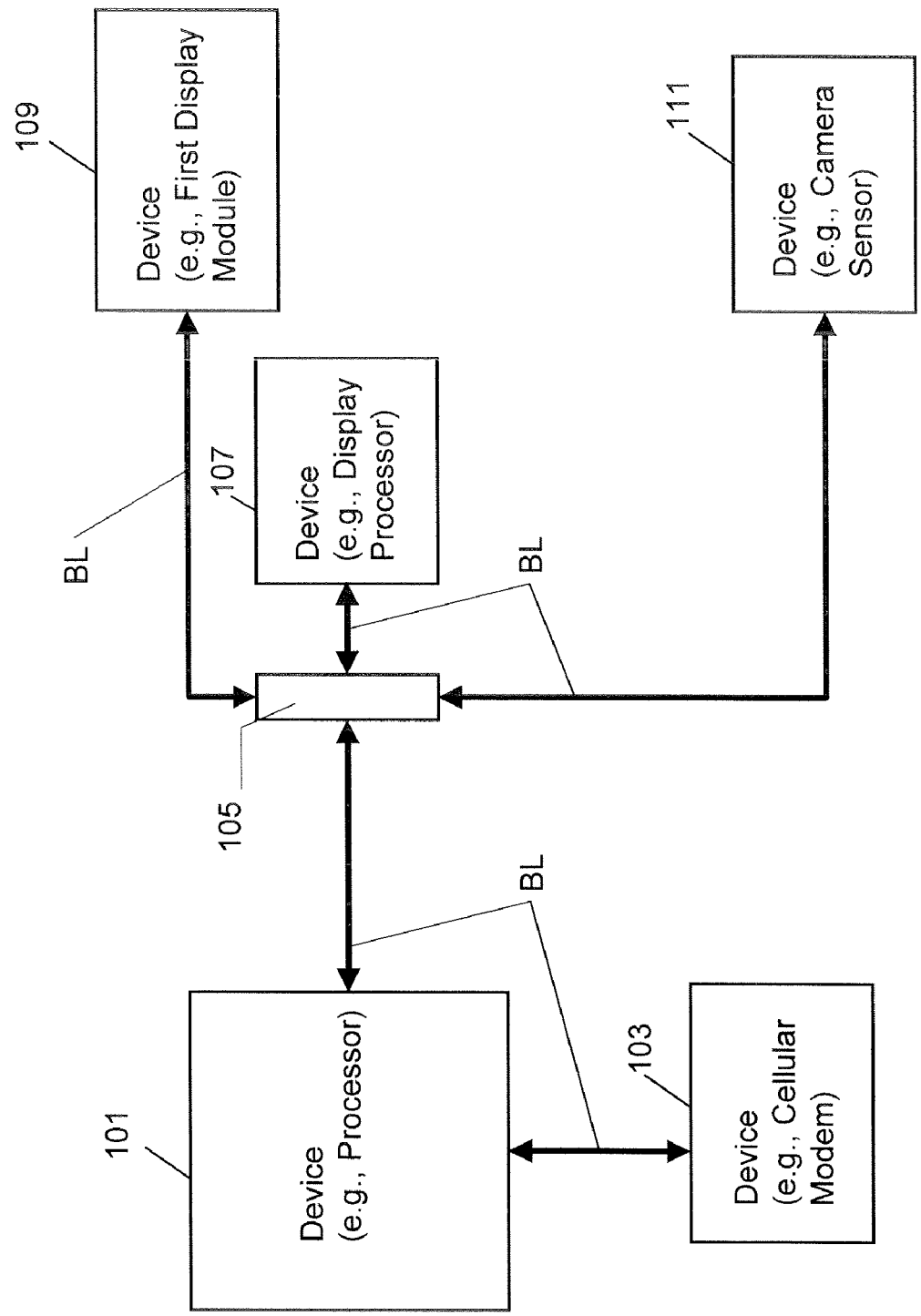
FIG. 1 is a diagram of a network system capable of providing a reset procedure, in accordance with an embodiment of the invention.

FIG. 1 is a diagram of a network system capable of providing reset procedure, in accordance with an embodiment of the invention. An end point or device 101, such as a host processor or the like, can use the network system with its communication protocol to connect to multiple other end points or devices 103-109 via bidirectional connection links BL. However, the connection links BL can be independent and do not work together to form the network, as in this example there is no provision to route data through an end point or device. In the example of FIG. 1, this means that a device 111 (e.g., a camera sensor or the like) needs a switch 105 to communicate with a device 107 (e.g., a display processor or the like), i.e., to route data between the respective end points. Such a configuration might be desirable to reduce the cabling in systems where the components are located in physically separate chambers such as for example in a mobile flip-phone or the like.

As can be gathered from FIG. 1, a device 101 is connected via two connection links to other devices in the network system. A device 103 (e.g., a cellular modem or the like) is only connected to device 101, and a device 111 is connected to device 101, device 107 and device 109 (e.g., a first display module #1). Thus, two independent networks are depicted in FIG. 1, namely a first network comprising the link between devices 101 and 103 and a second network comprising the links connecting devices 101, 107, 109, 111 and the intermediate switch 105. The same identity (ID) may thus be assigned to a device on one network (e.g., device 103) and to a device on the other network (e.g., device 111).

It is noted that the switch 105 not necessarily has to be a logically separate or discrete component. It might as well be integrated onto the same die as the devices to avoid increasing the component count.

Figure 2:
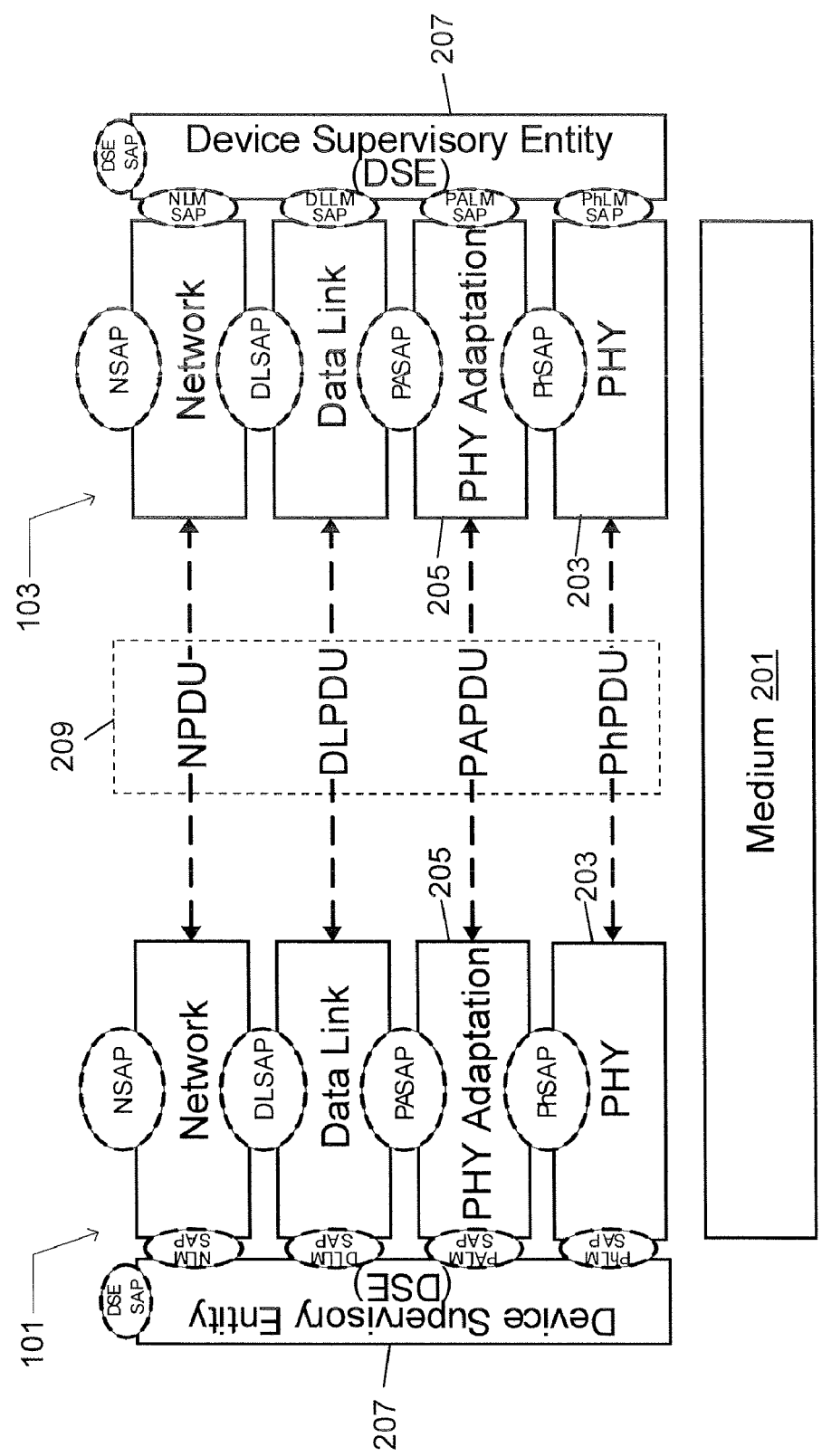
FIG. 2 is a diagram of a protocol layer stacks of network entities connected via a transmission medium, in accordance with an embodiment of the invention.

FIG. 2 shows a schematic diagram indicating protocol layer stacks of network entities, e.g., devices 101 and 103 connected via a transmission medium 201.

Typically, network protocols are organized as a stack in accordance with the OSI reference model. A protocol stack layer is independent of higher layers but depends on the layer directly below it.

The interfaces between the protocol layers are only defined at an abstract level known as Service Access Points (SAPs).

In FIG. 2, the OSI physical (PHY) layer has been split into two sub-layers, a lower PHY sub-layer 203 and an upper PHY adaptation layer 205, e.g., PHY Adaptation Layer 205 which provides a PHY-independent service interface to the above data link layer (L2).

Upper layers use the services of lower layers by communicating through the respective SAP. In addition, each layer exposes a SAP for configuring the layer, retrieving status information and initializing the layer to a known state. This SAP is known as the layer management SAP (LMSAP). Thus, for the example of the network layer (L3), the layer management SAP is known as NLMSAP. Furthermore, a layer management SAP (e.g., NLMSAP) is provided to a device supervisory entity (DSE) 207 for configuration and management purposes.

FIG. 2 relates to a case where two devices 101 and 103 are directly connected. However, one or more switches may be arranged between both devices. These switches forward packets to their designated destination. Then, protocol layers may be arranged in a manner that device 101 does not need to know whether it is connected directly to device 103 or whether there are intermediate switches. The data units that travel over the media are called Protocol Data Units (PDUs) 209 and are described at multiple levels of abstraction (i.e., "x PDU" whereby the "x" designates one of protocol layers).

A PHY adaptation layer 205 is provided to make the network protocol independent from the specific technology of the PHY layer (L1). Internal implementation details of the PHY layer 203 are not known to the data link layer. This provides the advantage that implementation of the physical adaptation layer is not restricted to any specific set of physical layer technologies. The PHY adaptation layer 205 can thus hide the technical details of the PHY layer (L1) 203 and provides a fixed control and data interface (PASAP) to higher protocol layers.

Figure 3:
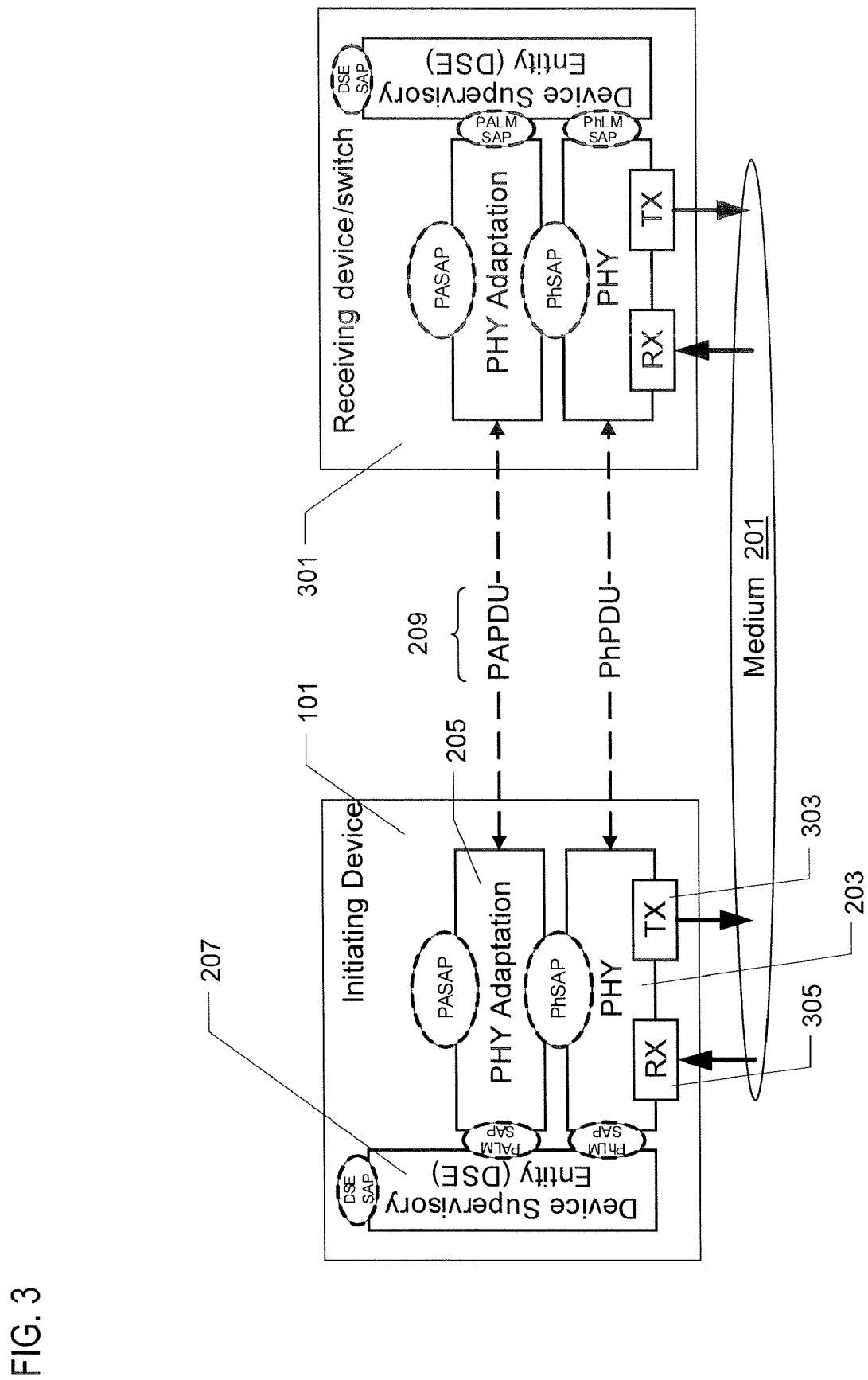
FIG. 3 is a diagram of a reset trigger distribution system, in accordance with an embodiment of the invention.

FIG. 3 shows a schematic block diagram of a reset trigger distribution system, according to one embodiment. In particular, lower layer parts of respective protocol stacks of a transmitting device, e.g., device 101 of FIG. 1, and a receiving device or switch 301 are shown. In the receiving device 301 on the right-hand portion of FIG. 3, the same blocks and functionalities are denoted by the same reference numerals as in the transmitting device 101 on the left-hand portion.

The PHY layer (L1) 203 is shown here, which comprises a transmitting (TX) unit 303 and a receiving (RX) unit 305 for transmitting and, respectively, receiving data via a wired or wireless transmission medium (not shown). Although signaling bits are physically transmitted via the TX and RX units 303, 305 through the transmission medium, PHY Adaptation Protocol Data Unit (PAPDU) symbols are virtually exchanged between the respective physical adaptation layers 205 and PHY encoded symbols are virtually exchanged between the respective PHY layers 203.

In an exemplary embodiment, three types of reset procedures may be available, which can be signalled in-band over a connection link. A first reset type ("ResetType1") may be provided, which resets the entire protocol stack and also configuration parameters and protocol statistics. Furthermore, a second reset type ("ResetType2") may be provided, which also resets the entire protocol stack, but leaves protocol statistics unaffected. Additionally, a third reset type ("ResetType3") may be provided, which may be used to reset an application (e.g., modem, graphics engine etc.) which is connected to a device port.

The signalling of the above resets is performed in a robust way, since according to one embodiment only physical layer 203 features and PHY adaptation layer 205 features are used to indicate the events over the connection link. No higher layers like data link layer, network layer or transport layer are involved in the transmission of these events. Thus, failures in the higher layers will not have any impact on the reset signalling.

According to one embodiment, signalling of the above first to third reset types is made network-compliant without compromising robustness. This is achieved by introducing low-level features to spread a reset trigger throughout the network and filter it at each network entity (e.g., component, device, module etc.) in a way that only the targeted network entity (or entities) perform(s) the requested reset action or procedure. As such, any failures in higher protocol layers or even in the controlling application does not affect the reset capability.

In an exemplary implementation of a network of devices, a reset trigger can be sent from any device (e.g., a main application processor 101) to any other device (e.g., a graphics accelerator chip) to resolve an error situation or any other abnormal situation. In addition, a 'broadcast reset trigger' or 'multicast reset trigger' can be defined to reset every device or a group of devices in the network to restart a completely congested network.

Thus, over each link, the reset trigger is signalled by utilizing PHY adaptation layer 205 services. To reach any device in the network, the reset trigger is spread on the PHY adaptation layer level 205, i.e. by using PAPDUs. When a device receives a reset trigger on one of its device ports, it checks an included device indicator, e.g., a 'TargetDeviceID' field or the like.

If the device indicator matches a potentially system-wide defined broadcast identity, the requested reset procedure is performed inside the device before or after the reset trigger has been distributed by forwarding the reset trigger via all or at least one of the remaining device ports.

If the device indicator potentially matches a defined multicast identity and the device is one of the multicast targets, the requested reset procedure is performed inside the device before or after the reset trigger has been distributed by forwarding the reset trigger via all or at least one of the remaining device ports.

If the device indicator matches the identity (ID) of the device, the requested reset procedure is performed inside the device. Otherwise the reset trigger is distributed by forwarding the reset trigger via all or at least one remaining device port.

In the embodiment, a parameter value of a specific PAPDU of the physical adaptation layer is used to signal the reset trigger.

FIG. 4 is a diagram indicating exemplary parameter values 401 for signaling reset types 403, in accordance with an embodiment of the invention. FIG. 4 shows an exemplary case of parameter allocation in a network system. Here, the PHY adaptation layer 205 may send a predetermined PAPDU (e.g., a 'PA Escaped DATA PAPDU') with a parameter value (e.g., PAParam=[0×0|0×02 |0×03]) set 401 to a reset command 403 according to the table of FIG. 4.

Additionally, the PHY adaptation layer 205 may send an additional one of the predetermined PAPDU with a parameter value set 401 to a specific target device identity (e.g., TargetDeviceID) or an identity defining a plurality of devices (e.g., BroadcastID, MulticastID), which could be abbreviated for example by "ESC_PA_ID#".

FIG. 5 shows an exemplary format of the reset trigger based on two PAPDUs 501, 503. In the present example, the PHY adaptation layer 205 uses PAPDUs with a length of 17 bit. Thus, a 17-bit symbol (or PAPDU) can hold two bytes of data plus an associated control or data flag. This flag, for example, allows for distinguishing special symbols for protocol use from any possible payload data. It is noted that the use of such 17-bit symbols at the PASAP is independent of the symbol encoding technique employed in the PHY layer 203 itself. The PHY Adaptation layer symbols are thus translated to the symbols supported by the PHY layer 203.

As a result, the reset trigger sent over the link has a format with two PAPDUs 501, 503 as indicated in FIG. 5. FIG. 5 is a diagram indicating an exemplary reset trigger format, in accordance with an embodiment of the invention. The first PAPDU 501 is used to signal the type of reset as indicated in the table of FIG. 4, wherein the lower 8 bits (bit No. 0 to 7) 505 are used to indicate the parameter value of the reset type while the next higher 9 bits (bit No. 8 to 16) 507 are used to identify this PAPDU 503 as a "PA Escaped Data PAPDU". Additionally, in the second PAPDU 503, the device indicator "TargetDeviceID" 509 may be again signalled in lower 8 bits (bit No. 0 to 7) to encode device IDs#0.255 and thus designate the device which shall be reset. A predetermined broadcast ID may be defined, e.g., ID#255, to reset all entities in the network. Similarly, predefined multicast IDs may be defined, e.g., ID#253, ID#254 to reset parts of the network. Again, the next higher 9 bits (bit No. 8 to 16) 511 are used to identify this PAPDU as a "PA Escaped Data PAPDU".

It is apparent that other suitable bit allocation schemes may be provided for signalling the device indicator and reset type information. It may as well be possible, for example, to signal both above 8-bit parameter values in a single PAPDU.

Figure 6:
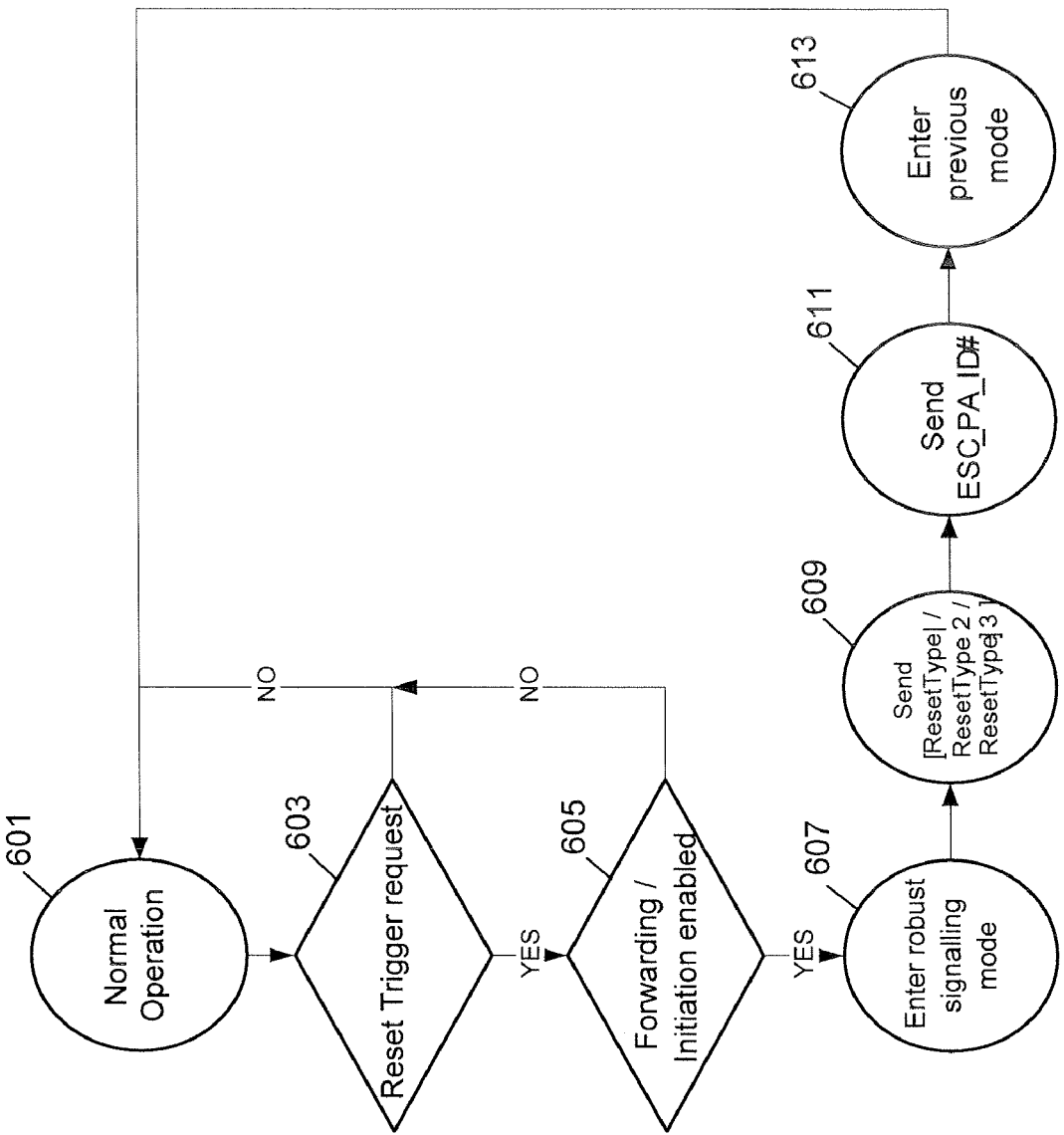
FIG. 6 is a flowchart of a reset trigger transmission procedure, in accordance with an embodiment of the invention.
Figure 7:
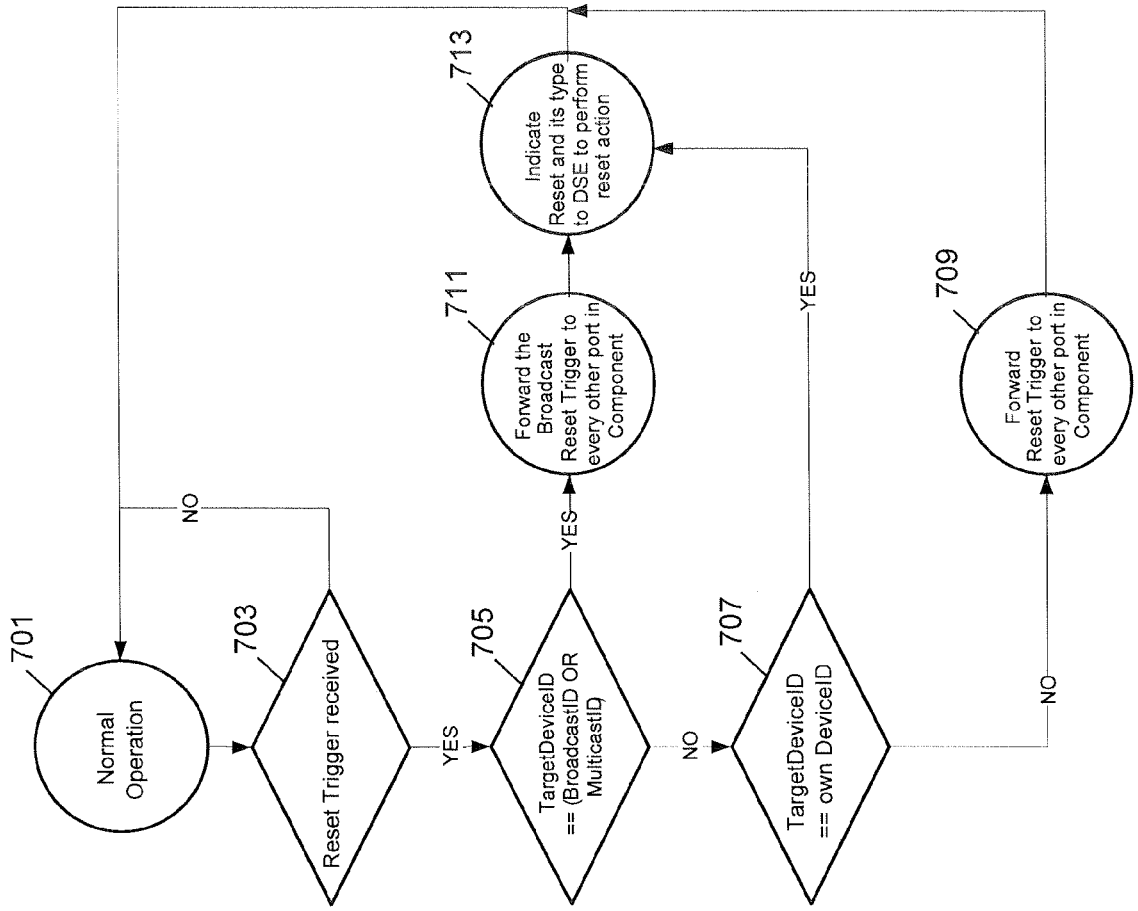
FIG. 7 is a flowchart of a reset trigger reception procedure, in accordance with an embodiment of the invention.

The following flowcharts of FIGS. 6 and 7 show exemplary procedures to transmit and receive a reset trigger over a connection link of the network. FIG. 6 is a flowchart of a reset trigger transmission procedure, in accordance with an embodiment of the invention. The procedure starts with normal operation, per step 601, of the respective triggering network entity. Upon receipt of a reset trigger request, per step 603, e.g., signalled by the DSE 207 via the PALM SAP, the PHY adaptation layer 205 checks, per step 605, whether it is enabled to initiate or forward the reset trigger. In case forwarding determined to be is disabled, the reset trigger request is ignored and the network entity stays in the normal operation. Otherwise, the procedure proceeds to the next step 607, where the PHY adaptation layer 205 leaves the normal operation mode with the current power mode and enters optionally a robust signaling mode. This robust signaling mode may be a low-power CMOS mode which provides most robust signalling mode. Then, per step 609, the PHY adaptation layer 205 sends one of the above specific PAPDUs 403 for reset type indication, and thereafter it sends a second PAPDU for target device(s) indication (e.g., ESC_PA_ID#) in the subsequent. (per step 611) Finally, in step 613, the PHY adaptation layer 205 may leave the potentially entered robust signaling mode and return to the previous power mode of the normal operation. It is noted that steps 607 and 613 are optional.

FIG. 7 shows a schematic flow diagram of a reset trigger reception procedure according to one embodiment. The procedure starts with a receiving network entity being in the normal operation mode (step 701). Upon reception of a reset trigger, per step 703, the PHY adaptation layer 205 checks, as in step 705, whether the device indicator matches to the optionally defined broadcast ID or multicast ID. In case the broadcast ID (or a matching multicast ID) has been received, step 711 is performed, where the broadcast reset trigger is forwarded via every other port provided at the receiving network entity (as defined in steps 605 to 613 of FIG. 6), i.e., forwarding of a broadcast reset trigger. Then, step 713 is performed where the reset and its type is indicated to the DSE 207 to initiate the respective reset action or procedure. The reception of the reset trigger is thus indicated to the local DSE 207. The indication includes the type of received reset. Depending on the type of reset, the DSE 207 will then initiate the requested reset type at the receiving network entity.

Otherwise, in case no broadcast (or multicast) reset trigger has been received, step 707 is performed as the next step, where the PHY adaptation layer 205 checks whether the device indicator matches to the own device ID. In case it matches, step 713 is the next step to be performed, and the designated reset action or procedure is initiated. Otherwise step 709 is to be performed where the received reset trigger, containing the reset type and device indicator is sent (as defined in steps 605 to 613 of FIG. 6) on all available ports of the receiving network entity, i.e., forwarding of a specific reset trigger for a different entity.

In the following, low-level spreading or propagation of reset triggers is explained with reference to FIG. 8.

Figure 8:
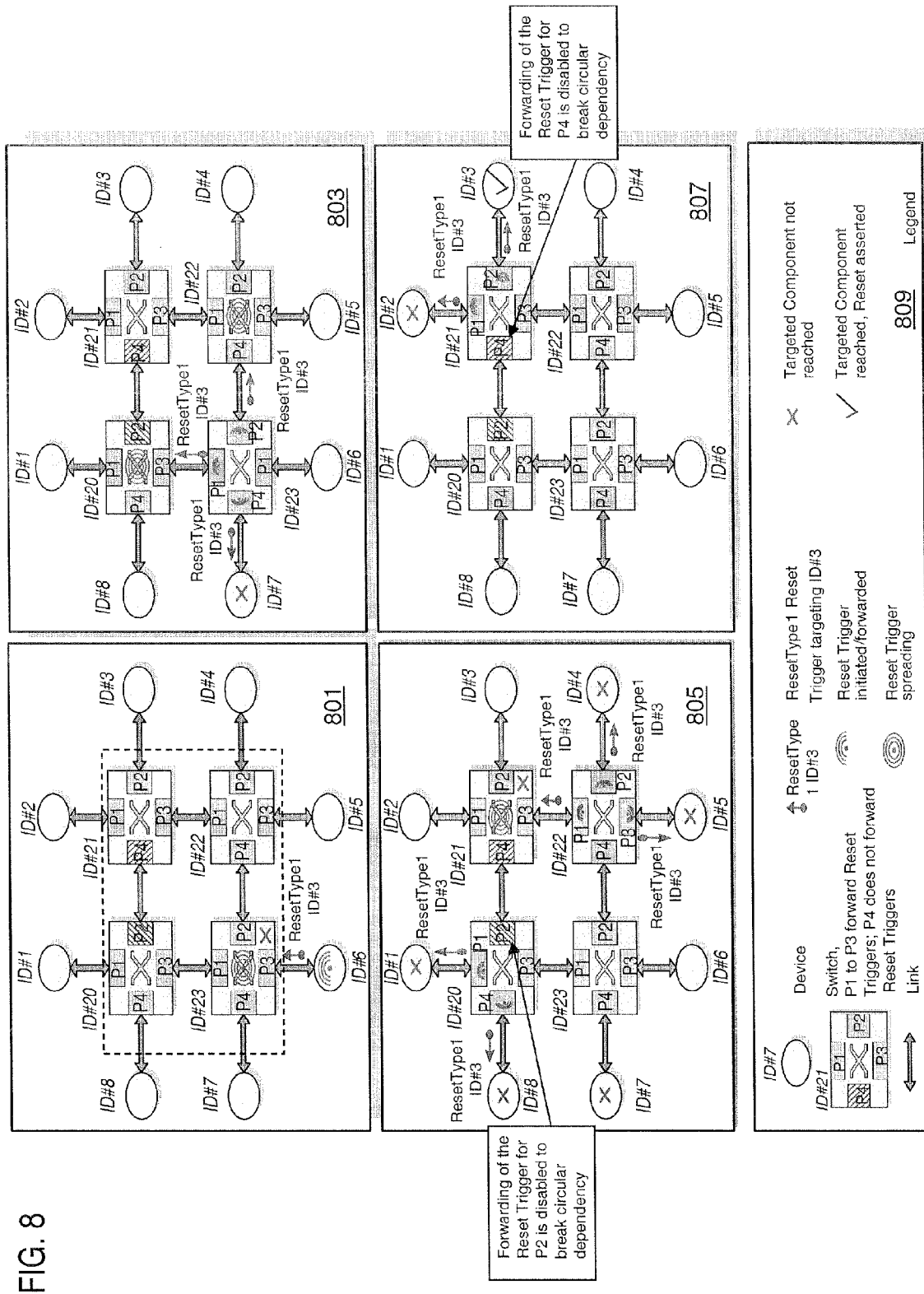
FIG. 8 is a diagram indicating a step-wise reset trigger distribution process, in accordance with an embodiment of the invention.

FIG. 8 is a diagram indicating a step-wise reset trigger distribution process, in accordance with an embodiment of the invention, which allows the reset trigger to reach the target entity without network layer knowledge (routing tables etc.). The graphical sequence of steps 801, 803, 805 and 807 uses symbols defined in the lower legend box 809 of FIG. 8. The sequence indicates reception and broadcasting of a reset trigger over one or multiple link(s). The network of FIG. 8 includes twelve entities, namely eight devices ID#1 to ID#8 and four switches ID#20 to ID#23 forming a mesh-topology. Here, a potential problem is a circular dependency in the routing, which has to be considered for normal data transfer as well. It can be easily overcome by simply disabling the reset trigger forwarding mechanism for certain switch ports to break the circular dependency (shown in steps 805 and 807 of FIG. 8).

The complete procedure starting with the reset trigger initiation, the reset trigger spreading and forwarding and the final reset assertion at the target entity is explained below.

In step 801, a reset trigger of type "ResetType1" is initiated by the device with ID#6 targeting the device with ID#3. Since the switch ID#23 is not the targeted entity and no broadcast or multicast reset has been issued, the switch ID#23 distributes the reset trigger to every one of its other ports, as indicated in step 803.

The reset trigger is forwarded in step 803 via any switch port. None of the receiving components own the ID#3. The device ID#7 disregards the reset trigger, as there is no match with the own ID. The switches simply spread the reset trigger.

Similar to step 803 the reset trigger is disregarded by all devices ID#4, ID#5, and ID#8 in step 805, and the switches spread the reset trigger. The reset trigger forwarding mechanism of port P2 of switch ID#20 is disabled. Therefore, the reset trigger is not forwarded by this switch port and thus the circular dependency is broken.

Similar to step 805, port P4 of switch ID#21 is disabled for forwarding in step 4 807. The device ID#2 disregards the reset trigger, but device ID#3 finally receives the reset trigger and checks the incoming ID#3 against its own device ID. Since they match the reset is indicated to the component's DSE 207 and a reset of kind "ResetType1" is initiated.

Figure 9:
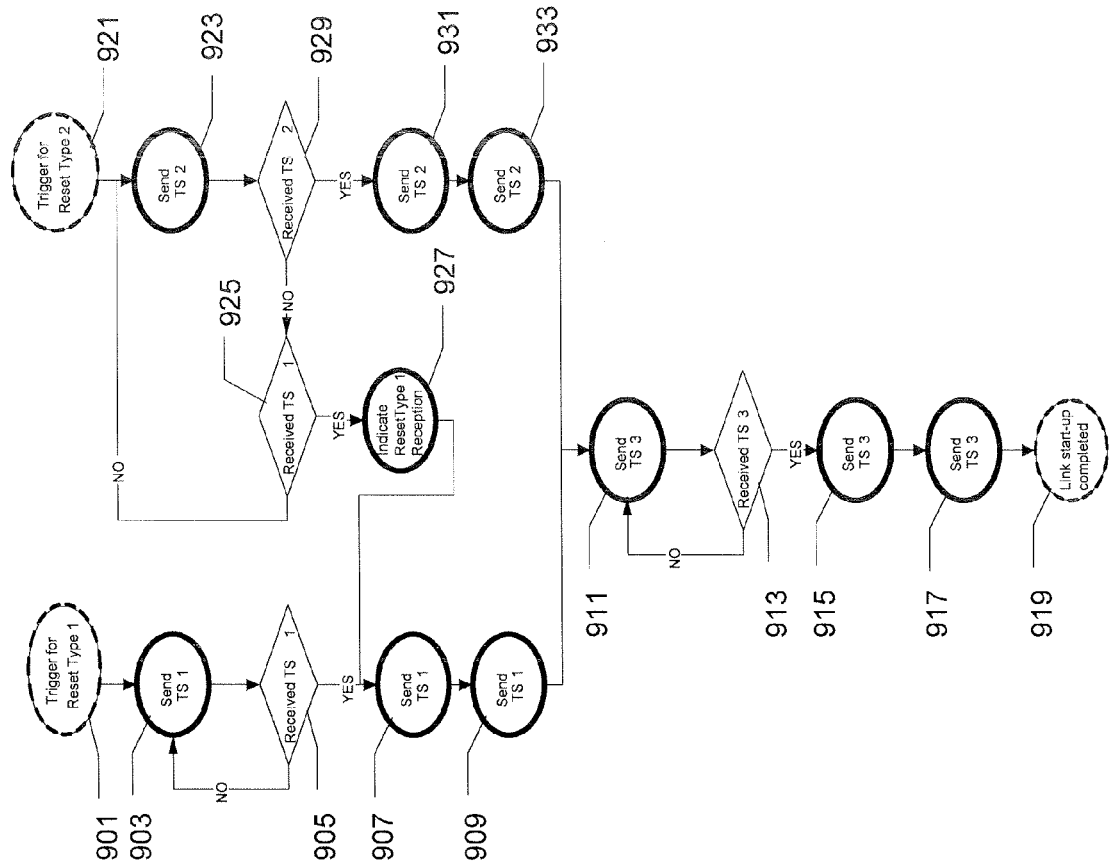
FIG. 9 is a flowchart of a link start-up sequence at initiator side, in accordance with an embodiment of the invention.
Figure 10:
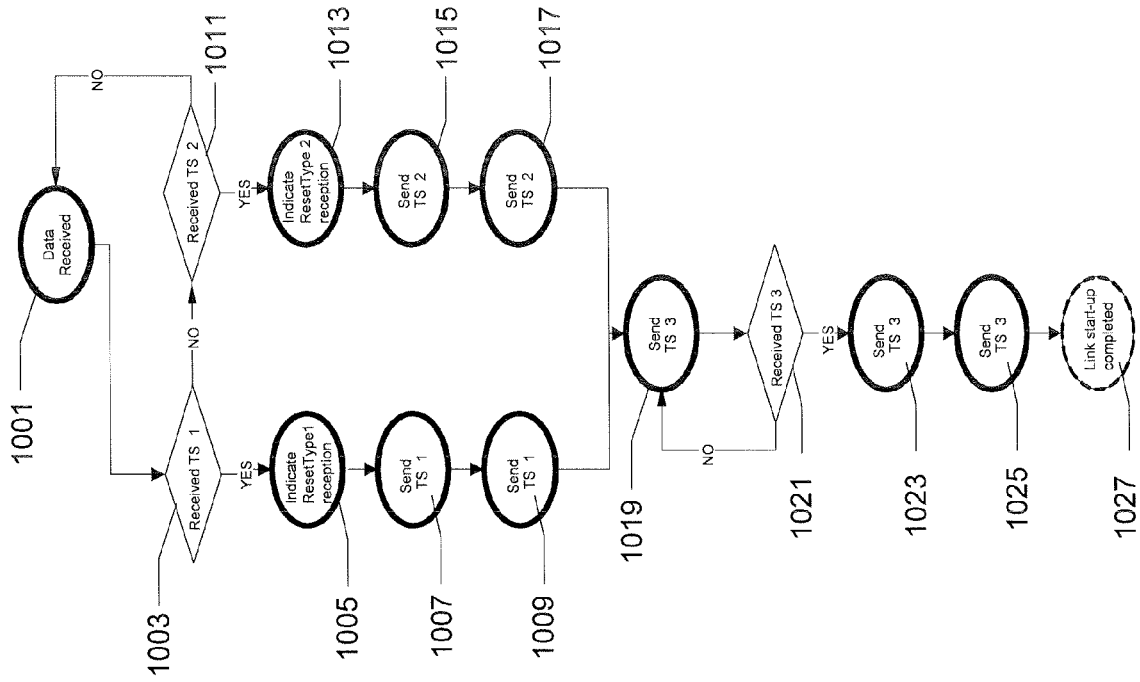
FIG. 10 is a flowchart of a link start-up sequence at receiver side, in accordance with an embodiment of the invention.

Once the reset is initiated, a link startup sequence, as defined in FIG. 9 and FIG. 10, may take place in transmitters and receivers, respectively, between port P2 of switch ID#21 and device ID#3.

More particular, the link start-up sequence may define three special symbols (e.g., TS1, TS2 and TS3) already provided by the used PHY layer (L1). In the exemplary case of the D-PHY layer, these special symbols can be mapped to special PHY layer triggers. In case of a PHY supporting character coding these symbols can be mapped to any control or k-codes.

As an example, the symbol TS1 may be used for identification of the above mentioned first reset type ("ResetType1"), the symbol TS2 may be used for identification of the above mentioned second reset type ("ResetType2"), and the symbol TS3 may be used for indicating the finalization of the link start-up sequence. Of course, any other allocation between trigger types and symbols can be used.

Illustrations of exemplary link start-up sequences for initiator and receiver sides are given in FIGS. 9 and 10, respectively.

FIG. 9 is a flowchart of a link start-up sequence at initiator side, in accordance with an embodiment of the invention. FIG. 9 shows a schematic flow diagram of a link start-up sequence at the initiator side according to one embodiment.

It is assumed here that the first reset type "ResetType1" has a higher priority than the second reset type "ResetType2". When one of these resets is received, then reception of this is indicated to the DSE 207 via the PALMSAP 209.

The procedure of FIG. 9 may be initiated by a first initial step 901 if a reset trigger for a first reset type "ResetType1" is detected, or alternatively by a second initial step 921 if a reset trigger for a second reset type "ResetType2" is detected.

In the above first case of the "ResetType1" signaling, a TS1 symbol is sent per step 903 by the PHY adaptation layer 205 which then checks per step 905 whether receipt of the symbol TS1 is acknowledged. If not, step 903 is repeated until receipt is acknowledged, per step 905. If the symbol TS1 is determined to be received, it is again sent two times, as in steps 907 and 909. Then, in step 911, the symbol TS3 is sent to signal finalization of the link start-up procedure. Again, it is checked, per step 913, whether the symbol TS3 has been received and the loop of steps 911 and 913 is repeated until receipt of the symbol TS3 has been verified. Thereafter, the symbol TS3 is again transmitted two times in steps 915 and 917 to complete the link start-up procedure (step 919)

In the above second case of a "ResetType2" signaling, a TS2 symbol is sent in step 923 by the PHY adaptation layer 205 which then checks per step 929 whether receipt of the symbol TS2 is acknowledged. If not, an additional checking step 925 is introduced to check whether a TS1 symbol has been received. The loop of steps 923, 929 and 925 is repeated until receipt of a TS2 symbol or a TS1 symbol is acknowledged in the respective one of steps 929 and 925. If a TS1 symbol is determined to be received, a "ResetType1" reception is indicated per step 927 and the procedure continues with the above step 907 as if a "ResetType1" had been triggered, due to its higher priority. On the other hand, if a TS2 symbol is determined to be received, it is again sent two times in steps 931 and 933. Then, in the procedure continues with the above step 911 to signal finalization of the link start-up procedure.

FIG. 10 is a flowchart of a link start-up sequence at receiver side, in accordance with an embodiment of the invention. FIG. 10 shows a schematic flow diagram of a link start-up sequence at the receiver side according to one embodiment.

If data is determined to be received in a first step 1001 by the PHY adaptation layer 205, it is checked per step 1003 whether TS1 symbol has been received. If not, it is checked in step 1011 whether a TS2 symbols has been received. The loop of steps 1001, 1003 and 1011 is repeated until a TS2 symbol or a TS1 symbol is determined to be received. If receipt of a TS1 symbol is determined per step 1003, a "ResetType1" reception is indicated per step 1005 and the procedure continues with returning the TS1 symbol two times to the transmission side per steps 1007 and 1009. Then, steps 911 to 919 of FIG. 5 are carried out to finalize the link start-up procedure. On the other hand, if a TS2 symbol is determined to be received, a "ResetType2" reception is indicated in step 1013 and the procedure continues with returning the TS2 symbol two times per steps 1015 and 1017. Then, in the procedure continues with steps 1019-1027, which resembles steps 911 to 919 of FIG. 9, to finalize the link start-up procedure.

This approach thus causes both nodes to identify the reset procedure and come out of it at the same time, ensuring a synchronized state as a starting point for the communication.

Alternatively, a similar procedure as described in FIG. 9 and FIG. 10 may be used to signal the reset trigger over a network. In that case, it may refine the step 609 and step 611 of FIG. 6 and the step 711 and the step 709 of FIG. 7.

One of ordinary skill in the art would recognize that the processes for resetting may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 11.

Figure 11:
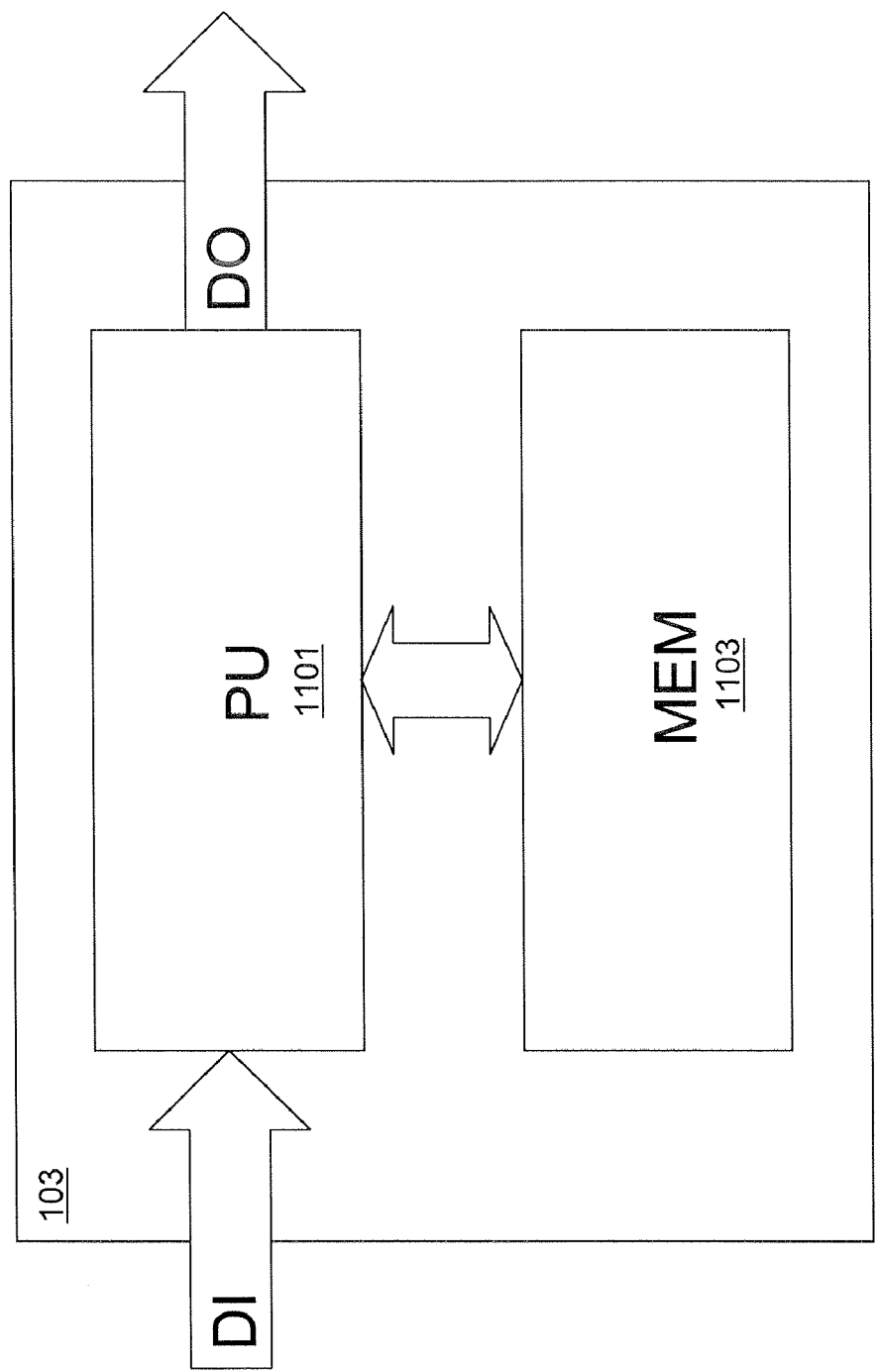
FIG. 11 is a diagram of computer-implemented hardware that can be used to implement various embodiments of the invention.

FIG. 11 shows a schematic block diagram of a software-based implementation of the proposed PHY adaptation layer 205 functionalities described above. These functionalities can be implemented with a processing unit 1101, which may be any processor or computer device with a control unit which performs control based on software routines of a control program stored in a memory 1103. Program code instructions are fetched from the memory 1103 and are loaded to the control unit of the processing unit 1101 in order to perform the processing steps of the above functionalities described in connection with the respective FIGS. 6 to 10 or with the respective blocks of FIG. 3. These processing steps may be performed on the basis of input data DI and may generate output data DO, wherein the input data DI may correspond to a received reset trigger (in case of a receiving network entity) or reset trigger request (in case of a transmitting network entity) and the output data DO may correspond to the control signalling required for spreading the reset trigger or indicating a reset procedure towards the DSE 207, respectively.

To summarize, a method, system, network entities and computer program product for providing a reset trigger signaling in a network have been described, wherein a reset trigger is generated, which carries a device indicator or device indicators for indicating a target device or plurality of target devices. To trigger a reset procedure, the reset trigger is signaled over the network by using a protocol layer lower than a network layer. At a network entity, it is checked whether the device indicator indicates this network entity; and the reset procedure is initiated in response to the result of this checking. Thereby, the reset trigger works independent of the network topology and will reach the destination device, even if a higher protocol layer is blocked due to error situations, so that a robust and flexible reset procedure can be provided.

Figure 12:
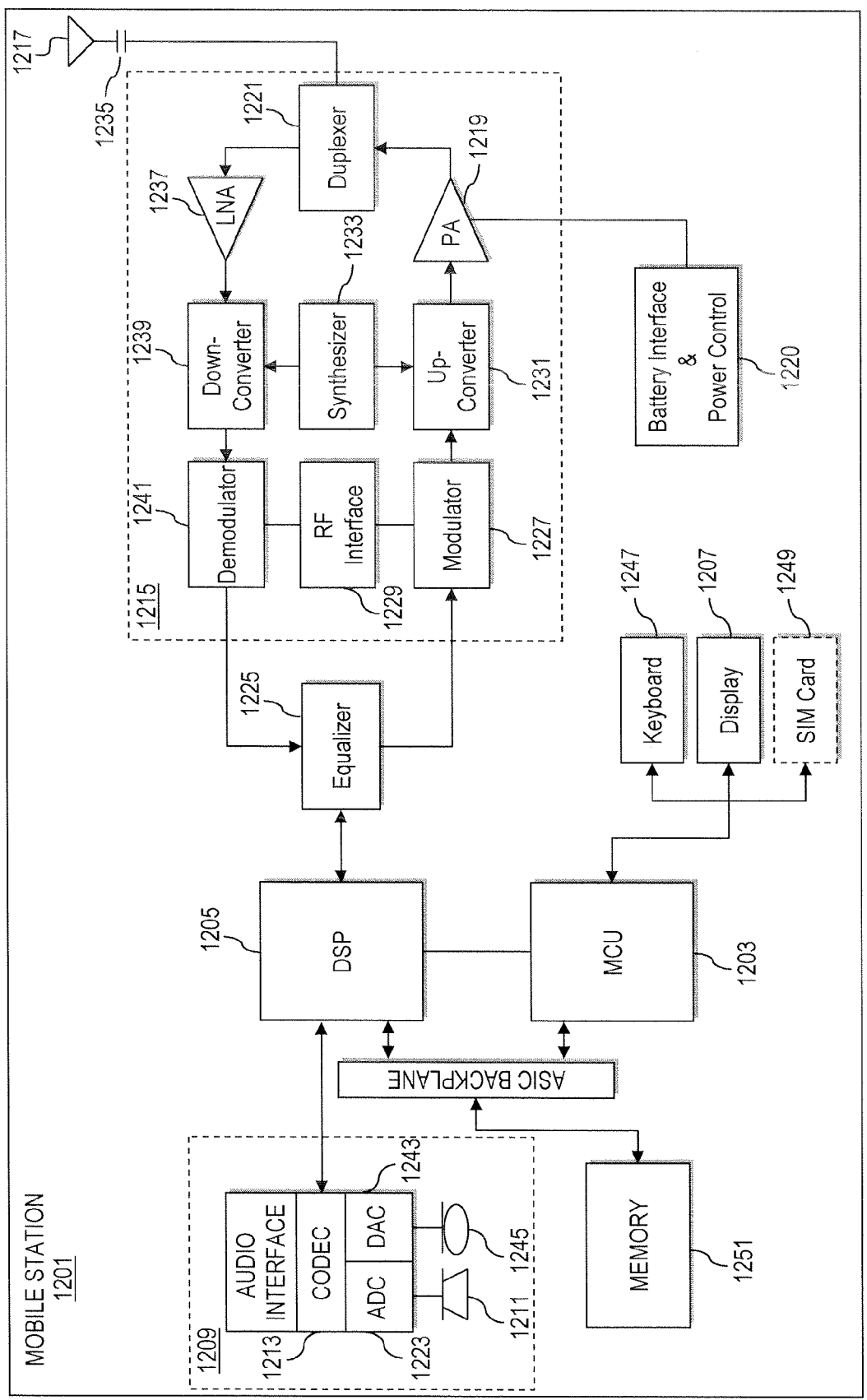
FIG. 12 is a diagram of exemplary components of a mobile station capable of operating in the system of FIG. 1, according to an embodiment of the invention.

FIG. 12 is a diagram of exemplary components of a mobile station (e.g., handset) capable of operating in the system of FIG. 1, according to an embodiment of the invention. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system (e.g., not shown), via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown). The MCU 1203 receives various signals including input signals from the keyboard 1247. The MCU 1203 delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201. The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data. An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

It is to be noted that the present invention is not restricted to the embodiments described above, but can be implemented in any internal and/or external network where individual or groups of network entities can be reset by a reset procedure. In cases where only one reset type is provided, signaling of a reset type may not be necessary, so that the reset trigger may only forward a device indicator. Additionally, format and length of the reset trigger may of course vary based on the protocol and its signaling structure and formats. The protocol layer used for signaling the reset trigger may be named differently. The various embodiments may thus vary within the scope of the attached claims.

What is claimed is:

1. A method comprising:
receiving a reset trigger for resetting at least one target network entity, wherein said reset trigger is received, via a protocol layer lower than a network layer, over an internal bidirectional network in an apparatus where said at least one target network entity resides, wherein the protocol layer uses at least one service of a physical layer for the receiving of the reset trigger;
checking at a network entity whether said indicator indicates said network entity; and
determining to initiate a network entity reset procedure in response to a result of said checking; and further comprising one or more of:
distributing said reset trigger via at least one remaining port of said network entity, which differ from a port through which said reset trigger has been received, if said indicator includes predetermined indications for a broadcast or multicast operation; and
distributing said reset trigger via remaining ports of said network entity, which differ from a port through which said reset trigger has been received, if said checking result indicates that said indicator does not indicate said network entity.

2. A method according to claim 1, wherein said protocol layer is a physical adaptation layer arranged between the physical layer and a data link layer.

3. A method according to claim 1, wherein said at least one target network entity, said network entity or a combination thereof is at least one of a circuit, a chip, a component, a module and a device.

4. A method according to claim 1, wherein said at least one target network entity, said network entity or a combination thereof is at least one of a terminal device, a network device, a network element, and a network node.

5. A computer-readable storage medium carrying one or more sequences of one or more instructions which, when executed by one or more processors, cause a network entity to perform the steps of claim 1.

6. A network entity comprising:
at least one processor; and
at least one memory including computer program code for one or more programs,
the at least one memory and the computer program code configured to, with the at least one processor, cause said network entity to perform at least the following,
determine to generate a reset trigger which carries an indicator for indicating at least one target network entity and is for resetting said at least one target network entity; and
determine to signal, using a protocol layer lower than a network layer, said reset trigger over an internal bidirectional network in an apparatus where said at least one target network entity resides, wherein the protocol layer uses at least one service of a physical layer for the signaling of the reset trigger, and
wherein said network entity is caused to further perform one or more of the following:
determine to signal said reset trigger by a first transmission indicating a type information and a second transmission indicating an indicator; and
determine to signal at least one of said type information and said indicator by setting a parameter value of a packet data unit of said protocol layer to a respective predetermined value.

7. A network entity according to claim 6, wherein said network entity is further caused to add to said reset trigger a type information indicating a reset type.

8. A network entity according to claim 6, wherein said protocol layer is a physical adaptation layer arranged between the physical layer and a data link layer.

9. A network entity according to claim 6, wherein said at least one target network entity, said network entity or a combination thereof is at least one of a circuit, a chip, a component, a module, and a device.

10. A network entity according to claim 6, wherein said at least one target network entity, said network entity or a combination thereof is at least one of a terminal device, a network device, a network element, and a network node.

11. A network entity, comprising:
at least one processor; and
at least one memory including computer program code for one or more programs,
the at least one memory and the computer program code configured to, with the at least one processor, cause said network entity to perform at least the following,
determine to generate a reset trigger which carries an indicator for indicating at least one target network entity and is for resetting said at least one target network entity; and
determine to signal, using a protocol layer lower than a network layer, said reset trigger over an internal bidirectional network in an apparatus where said at least one target network entity resides, wherein the protocol layer uses at least one service of a physical layer for the signaling of the reset trigger, and
add to said reset trigger a type information indicating a reset type, wherein said type information indicates at least one of a first reset type which resets the entire protocol stack and also configuration parameters and protocol statistics, a second reset type which resets the entire protocol stack, but leaves protocol statistics unaffected, and a device reset type which resets an application.

12. A network entity comprising:
at least one processor; and
at least one memory including computer program code for one or more programs,
the at least one memory and the computer program code configured to, with the at least one processor, cause said network entity to perform at least the following,
receive a reset trigger for resetting at least one target network entity, wherein said reset trigger is received, via a protocol layer lower than a network layer, from an internal bidirectional network in an apparatus where said at least one target network entity resides, wherein the protocol layer uses at least one service of a physical layer for the receiving of the reset trigger;

determine whether an indicator of said received reset trigger indicates said network entity; and determine to initiate a network entity reset procedure in response to the indicator determination, and wherein the network entity is caused to further perform one or more of the following:

determine to distribute said reset trigger via at least one remaining port of said network entity, which differ from a port through which said reset trigger has been received, if said indicator includes predetermined indications for a broadcast or multicast operation; and determine to distribute said reset trigger via remaining ports of said network entity, which differ from a port through which said reset trigger has been received, if said checking result indicates that said indicator does not indicate said network entity.

13. A network entity according to claim 12, wherein said network entity is further caused to select said network entity reset procedure based on a type information included in said reset trigger.

14. A network entity according to claim 12, wherein said protocol layer is a physical adaptation layer arranged between a physical layer and a data link layer.

15. A network entity according to claim 12, wherein said at least one target network entity, said network entity or a combination thereof is at least one of a circuit, a chip, a component, a module, and a device.

16. A network entity according to claim 12, wherein said at least one target network entity, said network entity or a combination thereof is at least one of a terminal device, a network device, a network element, and a network node.

17. A network entity comprising:
at least one processor; and
at least one memory including computer program code for one or more programs,
the at least one memory and the computer program code configured to, with the at least one processor, cause said network entity to perform at least the following,
receive a reset trigger for resetting at least one target network entity from an internal bidirectional network in an apparatus where said at least one target network entity resides via a protocol layer lower than a network layer, wherein the protocol layer uses at least one service of a physical layer for the receiving of the reset trigger;
determine whether an indicator of said received reset trigger indicates said network entity; and
determine to initiate a network entity reset procedure in response to the indicator determination, wherein said network entity reset procedure is selected based at least in part on a type information included in said reset trigger; and
wherein the network entity is caused to further perform one or more of the following:
receive said reset trigger by a first transmission indicating said type information and a second transmission indicating said indicator; and
derive at least one of said type information and said indicator from a respective parameter value of a packet data unit of said protocol layer.

18. A method comprising:
generating a reset trigger which carries an indicator for indicating at least one target network entity and is for resetting said at least one target network entity;
signaling, via a protocol layer lower than a network layer, said device reset trigger over an internal bidirectional network in an apparatus where said at least one target network entity resides so as to trigger a network entity reset procedure; wherein the protocol layer uses at least one service of a physical layer for the signaling of the reset trigger; and
adding to said reset trigger a type information indicating a reset type, wherein said type information indicates at least one of a first reset type which resets the entire protocol stack and also configuration parameters and protocol statistics, a second reset type which resets the entire protocol stack, but leaves protocol statistics unaffected, and a third reset type which resets an application.

19. A method according to claim 18, further comprising using predetermined symbols to convey said at least one of said first to third reset type.

20. A method according to claim 19, wherein said predetermined symbols are already provided by a used physical protocol layer.

21. A method according to claim 19, wherein said predetermined symbols are transmitted more than one time to trigger said network entity reset procedure.

22. A method according to claim 18 further comprising allocating to said first reset type a higher priority than to said second reset type.

23. A method comprising:
generating a reset trigger which carries an indicator for indicating at least one target network entity and is for resetting said at least one target network entity;
signaling, using a protocol layer lower than a network layer, said reset trigger over an internal bidirectional network in an apparatus where said at least one target network entity resides so as to trigger a network entity reset procedure, wherein the protocol layer uses at least one service of a physical layer for the signaling of the reset trigger; and
wherein said method further comprises one or more of the following:
signaling said reset trigger by a first transmission indicating a type information and a second transmission indicating an indicator; and
signaling at least one of said type information and said indicator by setting a parameter value of a packet data unit of said protocol layer to a respective predetermined value.

24. A method comprising:
receiving a reset trigger for resetting at least one target network entity from an internal bidirectional network in an apparatus where said at least one target network entity resides via a protocol layer lower than a network layer, wherein the protocol layer uses at least one service of a physical layer for the receiving of the reset trigger;
determining whether an indicator of said received reset trigger indicates said network entity; and
initiating a network entity reset procedure in response to the indicator determination,
wherein said network entity reset procedure is selected based at least in part on a type information included in said reset trigger; and
wherein the network entity is caused to further perform one or more of the following:

receiving said reset trigger by a first transmission indicating said type information and a second transmission indicating said indicator; and deriving at least one of said type information and said indicator from a respective parameter value of a packet data unit of said protocol layer.

25. A network entity comprising:

at least one processor; and at least one memory including computer program code for one or more programs, the at least one memory and the computer program code configured to, with the at least one processor, cause said network entity to perform at least the following, receive a reset trigger for resetting at least one target network entity from an internal bidirectional network in an apparatus where said at least one target network entity resides via a protocol layer lower than a network layer, wherein the protocol layer uses at least one service of a physical layer for the receiving of the reset trigger;

determine whether an indicator of said received reset trigger indicates said network entity;

initiate a network entity reset procedure in response to the indicator determination, wherein said network entity reset procedure is selected based at least in part on a type information included in said reset trigger; and wherein said type information indicates at least one of a first reset type which resets the entire protocol stack and also configuration parameters and protocol statistics, a second reset type which resets the entire protocol stack, but leaves protocol statistics unaffected, and a device reset type which resets an application.

26. A method comprising:

receiving a reset trigger for resetting at least one target network entity from an internal bidirectional network in an apparatus where said at least one target network entity resides via a protocol layer lower than a network layer, wherein the protocol layer uses at least one service of a physical layer for the receiving of the reset trigger;

determining whether an indicator of said received reset trigger indicates said network entity;

initiating a network entity reset procedure in response to the indicator determination, wherein said network entity reset procedure is selected based at least in part on a type information included in said reset trigger; and wherein said type information indicates at least one of a first reset type which resets the entire protocol stack and also configuration parameters and protocol statistics, a second reset type which resets the entire protocol stack, but leaves protocol statistics unaffected, and a device reset type which resets an application.

\* \* \* \* \*